(12) United States Patent
Miyamura et al.

(10) Patent No.: US 7,379,303 B2
(45) Date of Patent: May 27, 2008

(54) COMPUTING DEVICE MODULE (75) Inventors: Harold Miyamura, Roseville, CA (US); Michael Leslie Wortman, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 10/690,789

(22) Filed: Oct. 22, 2003

(65) Prior Publication Data

US 2005/0088825 A1  Apr. 28, 2005

(51) Int. Cl.
*H05K 7/20* (2006.01)

(52) U.S. Cl. .............. 361/715; 361/800; 361/752; 361/801

(58) Field of Classification Search ............ 361/752, 361/797, 790, 800–802, 715, 683–686, 756, 361/725, 737
See application file for complete search history.

(56) References Cited

U.S. PATENT DOCUMENTS

| | | | | |
|---|---|---|---|---|
| 3,685,005 A | * | 8/1972 | D'Alessandro | ............. 439/736 |
| 4,693,438 A | * | 9/1987 | Angell | ............. 248/27.3 |
| 4,885,436 A | * | 12/1989 | Pham et al. | ............. 200/50.11 |
| 4,985,806 A | | 1/1991 | Mazzullo et al. | |
| 5,557,499 A | * | 9/1996 | Reiter et al. | ............. 361/685 |
| 5,669,512 A | * | 9/1997 | Joslin | ............. 211/41.17 |
| 5,777,843 A | | 7/1998 | Younce | |
| 6,038,126 A | | 3/2000 | Weng | |
| 6,193,532 B1 | * | 2/2001 | Smithson | ............. 439/157 |
| 6,266,247 B1 | | 7/2001 | Stockwell et al. | |
| 6,288,901 B1 | | 9/2001 | Liu et al. | |
| 6,331,933 B1 | | 12/2001 | Rumney | |
| 6,466,433 B1 | | 10/2002 | Diaz et al. | |
| 6,490,157 B2 | | 12/2002 | Unrein | |
| 6,549,424 B1 | * | 4/2003 | Beseth et al. | ............. 361/801 |
| 6,603,657 B2 | * | 8/2003 | Tanzer et al. | ............. 361/685 |
| 6,606,256 B1 | * | 8/2003 | Lee et al. | ............. 361/825 |
| 6,754,085 B2 | * | 6/2004 | Kalkbrenner | ............. 361/752 |
| 2003/0161118 A1 | * | 8/2003 | Bovell | ............. 361/759 |
| 2003/0168365 A1 | * | 9/2003 | Kaern | ............. 206/364 |
| 2004/0047128 A1 | * | 3/2004 | McClelland et al. | ........ 361/690 |

OTHER PUBLICATIONS

QuickSpecs, Compaq ProLiant DL590/64, DA-10907, pp. 1-32, Aug. 22, 2002.
Photographs depicting Compaq ProLiant DL590/64, 3 photographs.

* cited by examiner

*Primary Examiner*—Tuan T. Dinh
*Assistant Examiner*—Hung S. Bui (57) ABSTRACT

A computing device module for receipt within a computing device chassis includes an enclosure and a handle movably coupled to the enclosure. The handle moves between an extended position and a retracted position. The handle includes at least one opening configured to permit at least one hand digit to extend through the at least one opening when the handle is in the retracted position.

48 Claims, 7 Drawing Sheets

COMPUTING DEVICE MODULE

BACKGROUND OF THE INVENTION

Many of today's computing devices utilize removable modules which house various components of the computing device. Such modules are connected to a main structure and perform distinct functions. The removable nature of the modules enables such computing devices to be more easily assembled, to be more easily repaired and to be more easily upgraded.

One example of such a module is a power supply module. The removable nature of the power supply module enables it to be easily replaced when an existing power supply becomes defective. Many computing devices have chassis including multiple bays for receiving multiple power supply modules, enabling such power supply modules to be hot swapped (i.e., exchanged without interrupting the supply of power) when one power supply fails.

Figure 1:
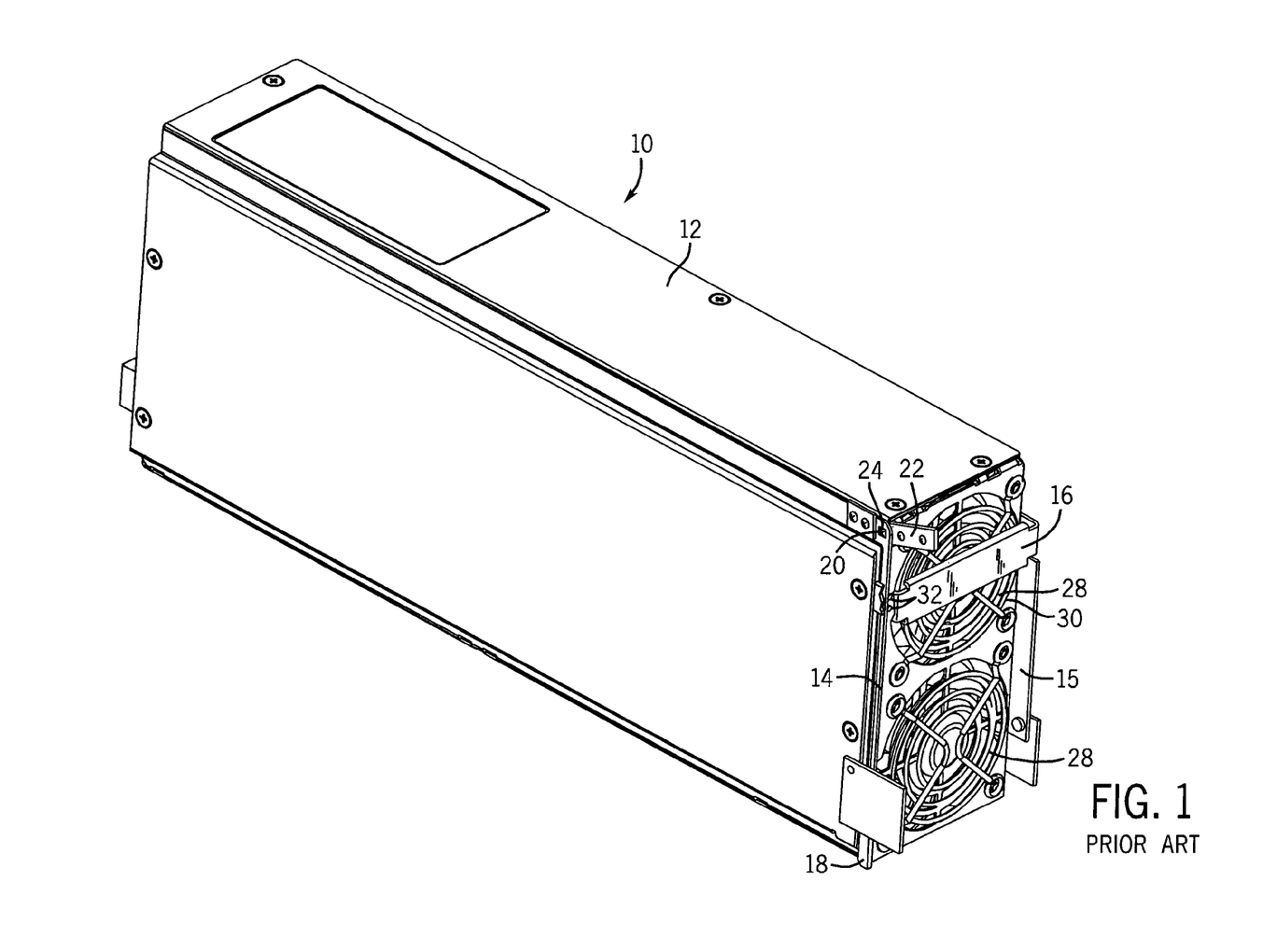
FIG. 1 is a perspective view of a known power supply module.

FIG. 1 illustrates a known power supply module 10. Power supply module 10 includes a housing 12, a pair of opposite arms 14 pivotally attached to housing 12 and a bar 16 extending between arms 14, 15. Arms 14, 15 and bar 16 are formed from a single sheet of metal. Arm 14 includes a downwardly projecting finger 18 which is received within a corresponding slot (not shown) formed in the floor of the chassis of the computing device in which module 10 is inserted. The pivoting of arms 14 moves the finger 18 into and out of the slot to retain module 10 within the chassis of the computing device.

Module 10 further includes a square opening 20 formed through arm 14 and an L-shaped spring latch 22 pivotally connected to housing 12. Spring latch 22 includes a dimple 24 corresponding to the opening 20 and resiliently retained within opening 20 formed on arm 14. Pivoting of tab 22 until dimple 24 snaps out of opening 20 allows arm 14 to unlock and swing backward. The positioning of the dimple 24 in the square hole 20 frictionally retains arms 14, 15 against movement.

Although utilized in many computing devices, arms 14, 15 and bar 16 of module 10 lessen the performance and compactness of module 10 and are difficult to manipulate and use. As shown by FIG. 1, bar 16 extends in close proximity to and across one of the air flow openings 28 of housing 20. As a result, bar 16 restricts air flow by blocking the air flow opening of module 10. In addition, bar 16 partially extends over and inhibits viewing of light emitting diodes 32 that indicate whether the power supply is malfunctioning. Because bar 16 is spaced from the grate 30 of opening 26 by approximately one-quarter of an inch or less, bar 16 provides limited hand access and is not ergonomic or intuitive to operate.

In addition, spring clip 22 is difficult to actuate and does not provide a robust means for securing arms 14, 15 and bar 16 in the position shown. As a result, spring clip 22 does not retain arms 14, 15 and bar 16 in the raised position shown when under the weight of module 10. Consequently, bar 16 cannot be used to carry module 10 while in the position shown. Lastly, legs 14, 15 and bar 16 are relatively expensive to manufacture and result in much wasted sheet metal.

DETAILED DESCRIPTION OF THE EXAMPLE EMBODIMENT

Figure 2:
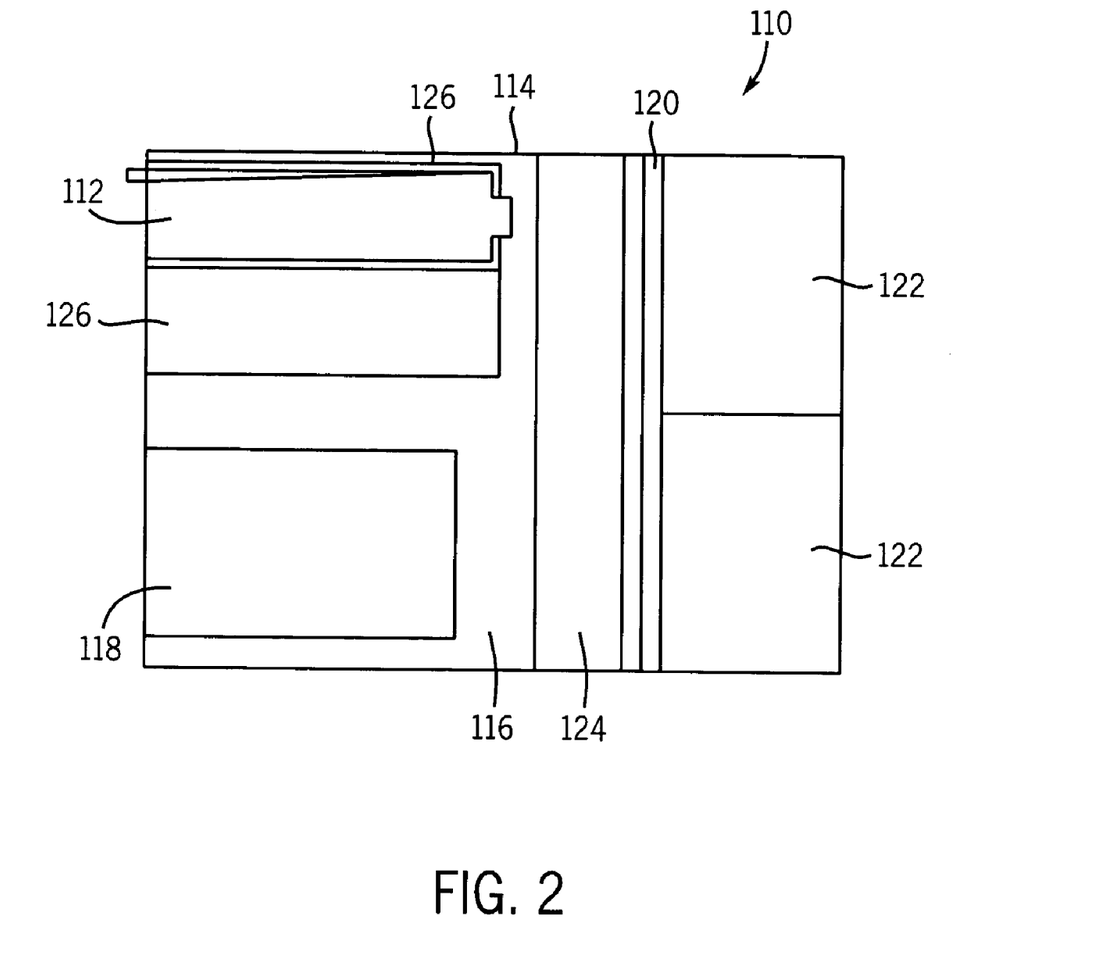
FIG. 2 is a schematic illustration of a computing device incorporating a module of the present invention.

FIG. 2 schematically illustrates computing system or device 110 incorporating computing device module 112. In addition to module 112, computing device 110 includes chassis 114, motherboard 116, input/output device 118, vertical back plane 120, auxiliary components 122 and fans 124. Chassis 114 generally comprises a structure which serves as a frame work for housing and supporting the internal components of computing device 110. Chassis 114 is configured to removably receive module 112 such that a portion of module 112 extends along an exterior of computing device 110. In the particular embodiment illustrated, chassis 114 forms two bays 126 wherein each bay 126 is configured to receive module 112. As a result, computing device 110 may be provided with modules 112, with one of modules 112 serving as a backup and enabling a replacement module 112 to be hot swapped with a failing module 112. In alternative situations, only one of bays 126 may be filled with module 112. Chassis 114 may have various sizes, shapes and configurations depending upon the size, shapes and configurations of the internal components supported and housed by chassis 114.

Motherboard 116 comprises a circuit board received within chassis 114. Circuit board 116 serves as an electronic highway interconnecting the internal components of chassis 114. Motherboard 116 may additionally include various other active and passive components either permanently connected to motherboard 116 or releasably connected to motherboard 116.

Input/output device 118 comprises electronic components configured to facilitate the input and output of signals to and from computing device 110. In one embodiment, input/output device 118 includes a plurality of input/output cards connected to motherboard 116 and having connectors along an exterior of computing device 110.

Vertical back plane 120 comprises a printed circuit board connected to motherboard 116 and in connection with auxiliary components 122. Back plane 120 serves as an auxiliary motherboard for such components. In alternative embodiments, back plane 120 may be omitted while auxiliary components 122 are directly connected to motherboard 116.

Auxiliary components 122 may comprise a variety of modules or units such as displays, portable memory storage and recording devices such as floppy drives, CD drives, DVD drives and memory units. Memory units may be in the form of a plurality of memory cards or a hard disk drive.

Fans 124 are configured to blow air at least partially through chassis 114 to cool the remaining internal components of computing device 110. Although fans 124 are illustrated as being situated between back plane 120 and module 112, fans 124 may be positioned in a variety of alternative locations within computing device 110.

Module 112 is removably received within chassis 114. Module 112 is configured to be easily secured or retained in place within chassis 114. Module 112 is also configured to be easily withdrawn from chassis 114 and to be easily carried or transported. Module 112 generally comprises a housing system and an electronic component contained within the housing system. In the particular embodiment illustrated, module 112 includes electronic components functioning as a power supply for computing device 110. In alternative embodiments, the housing structure of module 112 may be modified to contain and support other electronic components of computing device 110 such as input/output devices, auxiliary components and the like.

Figure 3:
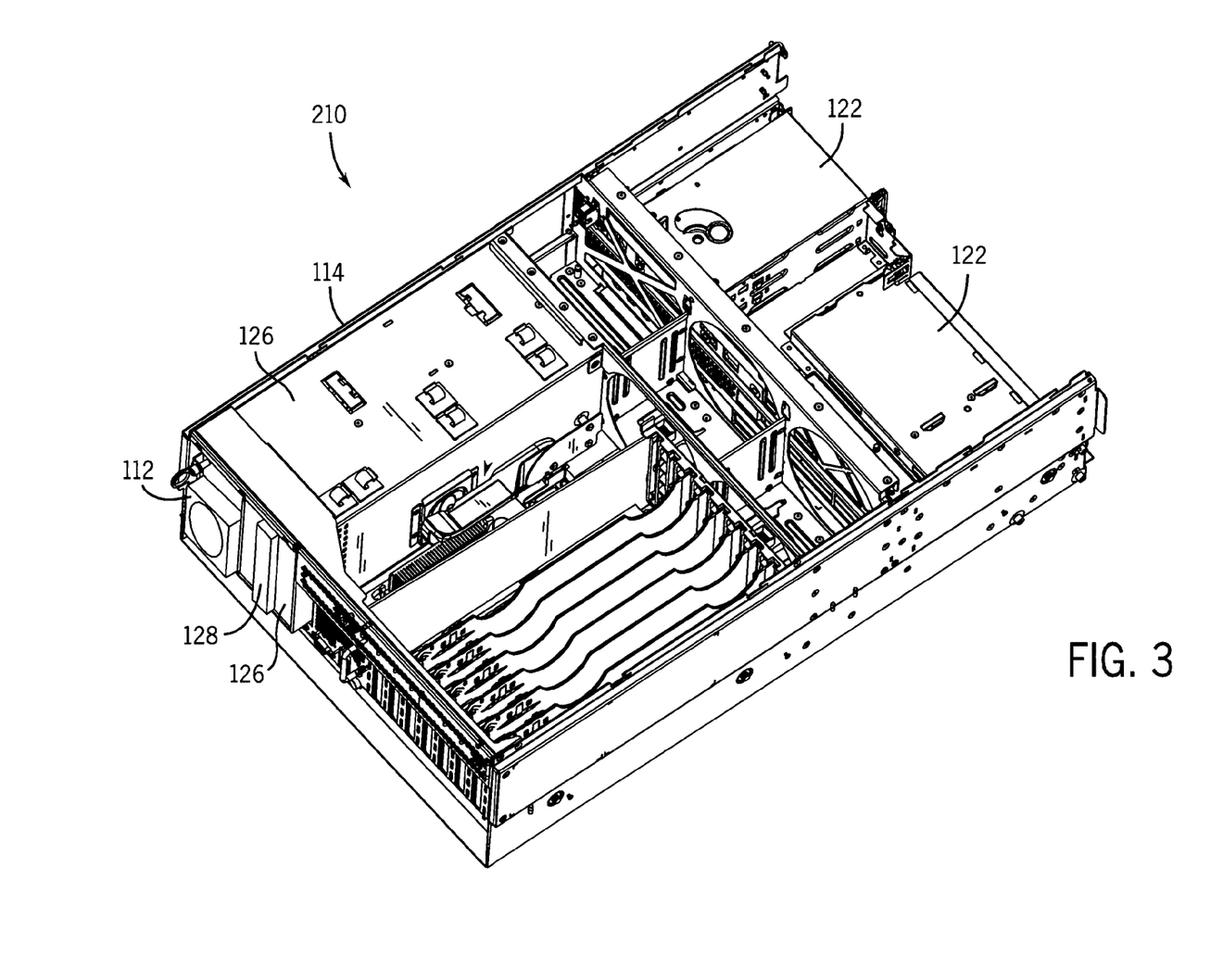
FIG. 3 is a perspective view illustrating one embodiment of the computing device of FIG. 2 incorporating one embodiment of the computing device module of FIG. 2, wherein portions of the computing device are not shown for purposes of illustration.
Figures 4, 4A:
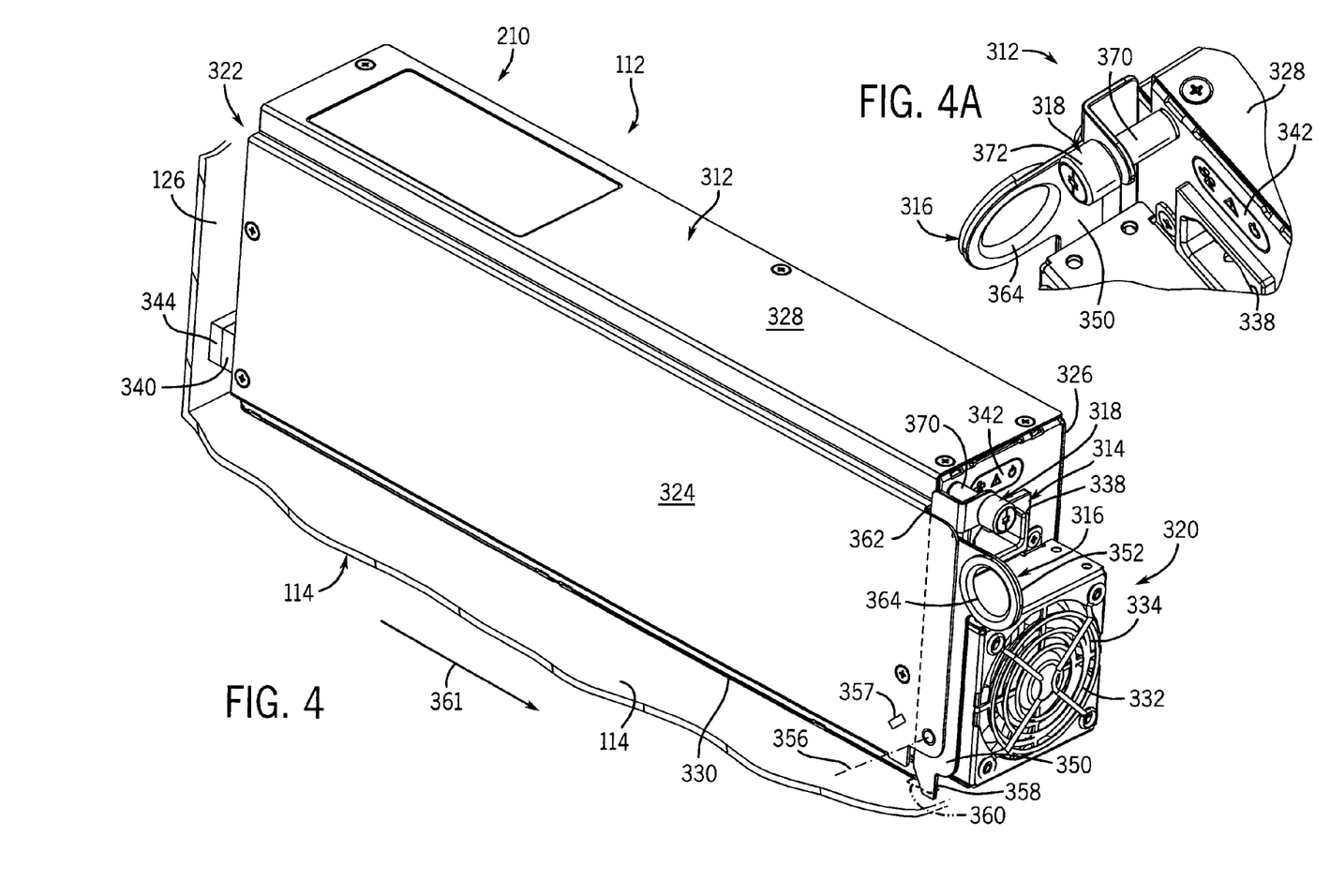
FIG. 4 is a fragmentary perspective view of the computing device of FIG. 3 illustrating the computing device module of FIG. 3 with its handle in a retracted position.
FIG. 4A is a greatly enlarged fragmentary perspective view of the computing device module of FIG. 4.
Figure 5:
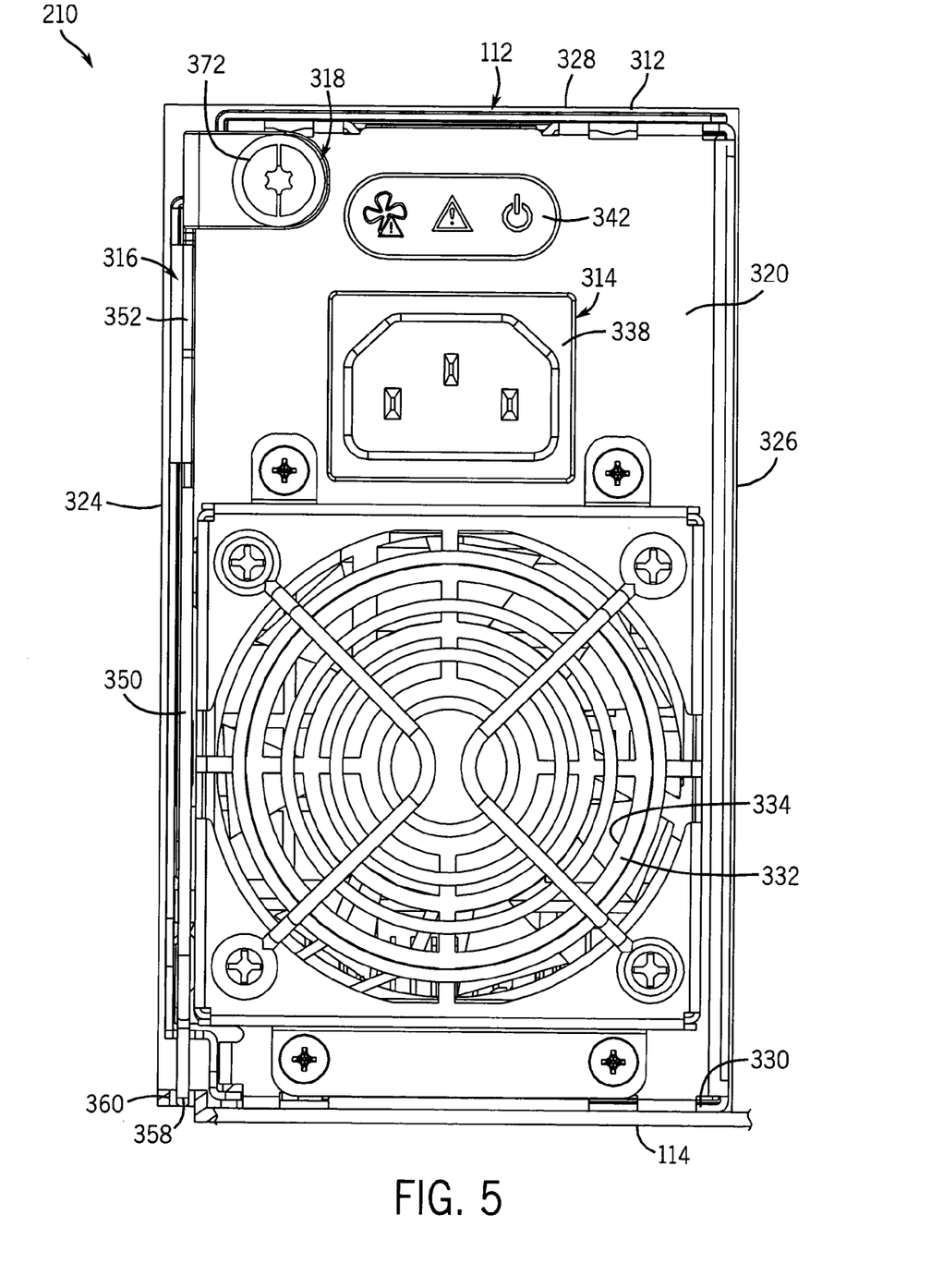
FIG. 5 is a rear end elevational view of the computing device and module of FIG. 4.

FIGS. 3-5 illustrate module 112 in greater detail. FIGS. 3 and 4 illustrate module 112 incorporated into computing device 210, an example of one embodiment of computing device 110 described with respect to FIG. 2. For ease of illustration, portions of computing device 210 are omitted. For example, computing device 210 is illustrated as omitting fans 124, input/output device 118 (typically daughter cards) and several auxiliary components 122 described with respect to computing device 110 shown in FIG. 2. Those remaining components of computing device 210 which correspond to components of computing device 110 are numbered similarly. A more detailed description of computing device 210, excluding module 112, is provided in co-pending U.S. patent application Ser. No. 10/442,036 filed by Bryan D. Bolich, Kenneth G. Robertson, Robert S. Jetter and Bradley D. Blackwood on May 20, 2003 and entitled "Computer System with Slidable Motherboard", the full disclosure of which is hereby incorporated by reference.

As best shown by FIG. 3, bays 126 of chassis 114 are configured to support module 112 such that module 112 forms an exterior face of computing device 210. In the particular embodiment illustrated, one of bays 126 is substantially blocked by a baffle 128 to force air flow through module 112. In alternative embodiments, baffle 128 may be removed and an additional module 112 may be positioned within the associated bay 126.

FIGS. 4 and 5 illustrate module 112 in greater detail. Module 112 generally includes support structure 312, electronic component 314, fan 313, handle 316 and retainer 318. Support structure 312 comprises a framework, base or other enclosure structure formed by one or more members configured to support and at least partially house or enclose electronic component 314. In the particular embodiment illustrated, support structure 312 includes ends 320, 322, side walls 324, 326, top 328 and bottom or floor 330. In the embodiment shown, side walls 324, 326, top 328 and bottom 330 comprise sheets or walls comprised of rigid materials such as galvanized sheet metal. End 322 includes a grate (not shown) facilitating air flow through support structure 312. In a similar fashion, end 320 includes a perforated screen 332 over an air flow opening 334 to facilitate complete air flow through support structure 312 to cool electronic component 314. Although support structure 312 is formed from rigid panels or walls of sheet metal, support structure 312 may alternatively be formed from various other materials. Moreover, the exact size, shape and configuration of support structure 312 may vary depending the size, shape and configuration of electronic component 314 enclosed within support structure 312.

Fan 313 is generally positioned between screen 332 and electronic component 314 so as to facilitate air flow across electronic component 314 through structure 312. In the particular embodiment illustrated, fan 313 comprises an externally mounted fan. In alternative embodiments, fan 313 may be located at end 322 and may be replaced with multiple smaller fans.

Electronic component 314 comprises a conventionally known power supply electronic component configured to convert input AC electrical power to DC electrical power to supply the electrical power required by the various components of computing device 210. Electronic component 314 includes, amongst others, power input 338, power output 340 and status indicator 342. Input 338 extends through end 320 of structure 312 and comprises a power cord socket.

Output 340 transmits electrical DC power out of module 112 to the remaining components of computing device 210. In the particular embodiment illustrated, output 340 comprises a conventionally known high density power connector. As shown by FIG. 4, output 340 extends beyond end 322 of structure 312 and mates with an opposite corresponding connector 344 connected to a printed circuit board of computing device 210. In alternative embodiments, output 340 may be located in other positions or along other faces of support structure 312. In the particular embodiment illustrated, connector 344 is supported by chassis 114 and is electrically connected to back plane 120 via a cabling (not shown). In alternative embodiments, connector 344 may be electrically connected to motherboard 116 or may be directly electrically connected to vertical back plane 120.

Status indicator 342 generally comprises an indicator light that indicates the status of power supply of electronic component 314. In particular, indicator 342 indicates whether power supply component 314 is functioning normally. In the particular embodiment illustrated, indicator 342 comprises a plurality of light emitting diodes. In alternative embodiments, status indicator 342 may comprise other light emitting sources or other displays.

Handle 316 facilitates the manipulation and transport of module 112. In the particular embodiment illustrated, handle 316 further assists in mating connectors 340 and 344 as well as retaining module 112 within chassis 114. Handle 316 generally includes lever arm portion 350 and grasping portion 352. Lever arm portion 350 is movably coupled to support structure 312 for movement between a retracted position shown in FIG. 4 and an extended position shown in FIG. 6. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

In the particular embodiment illustrated, lever arm portion 350 is pivotably coupled to side wall 324 for pivotal movement about axis 356. Pivotal movement of lever arm portion 350 about axis 356 is limited by an internal stop surface 357 coupled to side wall 324.

Lever arm portion 350 includes a detent-engaging structure 358. Detent-engaging structure 358 generally comprises a projection, extension or finger extending from the remainder of lever arm portion 350 on a side of axis 356 opposite grasping portion 352. Detent-engaging structure 358 is configured to be partially received within a corresponding detent 360 provided by chassis 114. Detent-engaging structure 358 engages the adjacent surfaces of detent 360 to retain module 112 within chassis 114 and against movement in the direction indicated by arrow 361. Although detent 360 is illustrated as an opening in chassis 114, detent 360 may alternatively comprise a depression or other recess for at least partially receiving detent-engaging structure 358.

As shown by FIG. 4, when handle 316 is in the retracted position, lever arm portion 350 substantially extends within a recess 362 formed along side wall 324. As a result, a substantial portion of lever arm portion 350 and handle 316 itself is nested out of sight when handle 316 is in the retracted position. At the same time, grasping portion 352 projects beyond recess 362.

Grasping portion 352 extends from lever arm portion 350 and provides a surface large enough to be sufficiently grasped by a person's hand to enable handle 316 to pivot about axis 356 and to also enable module 112 to be lifted and carried by way of grasping portion 352. In the particular embodiment illustrated, grasping portion 352 includes an opening 364 configured to receive at least one standard hand digit such that one or more digits completely extend through opening 364. For example, in one embodiment, opening 364 is configured to receive a medial segment of a standard adult finger, such as an index or middle finger, when handle 316 is in the retracted position shown. As a result, grasping portion 352 enables module 112 to be carried and transported using grasping portion 352 while handle 316 is in the retracted position and more securely coupled to support structure 312. Because opening 364 receives the medial segment of a finger, a person may simply hook grasping portion 352 with his or her finger without having to pinch opposing surfaces between a person's finger and thumb. Consequently, module 112 may be more easily carried without the risk of module 112 being accidentally dropped. In alternative embodiments, grasping portion 352 may be configured to receive the medial segment of more than one finger such as the middle finger and the index finger. In lieu of the grasping portion including a single opening which receives such multiple fingers, grasping portion 352 may alternatively include multiple distinct openings configured and arranged to receive such multiple fingers. In other embodiments, two digits, pressed tip-to-tip may collectively extend through opening 360. For example, opening 364 may be configured to permit a user to pinch his or her thumb and finger together within or through opening 364. For purposes of this disclosure, the term "hand digit" may refer to a human's thumb or a human's finger. For purposes of this disclosure, the term "standard" with reference to a digit, thumb or finger shall refer to the size and shape of a finger and a thumb as currently set forth and periodically revised in CSA C22.2 No. 60950-1/First Edition, Standard for Safety of Information Technology Equipment (ITE) p. 63 (describing a standard test finger having a general diameter of about 12 mm). Dimensional information not provided in UL 60950-1 may be supplemented from a statistical average United States female adult hand and associated digits.

In the particular embodiment illustrated, opening 364 is continuously bounded and includes an arcuate surface configured to engage the medial segment of the finger when the finger extends through the opening or when a thumb and forefinger are pinched together through the opening 364. The opening is also circular. As a result, the person's finger cannot slip or become otherwise accidentally dislodged from opening 364 while being comfortably engaged with the surfaces surrounding opening 364 as module 112 is being moved or carried. In alternative embodiments, opening 364 may have shapes other than a circle, may have non-arcuate surfaces which engage the medial segment of the finger when the finger extends through the opening and may be only partially bounded. In the particular embodiment illustrated, opening 364 has at least one dimension at least 18 mm. In the particular embodiment illustrated, opening 364 has a diameter of approximately 18 mm.

Grasping portion 352 generally extends from lever arm portion 350 in a plane parallel to or coextensive with the plane in which side wall 324 extends. In the particular embodiment illustrated, both lever arm portion 350 and grasping portion 352 extend within planes that are parallel to or coextensive with one another as well as being parallel to or coextensive with the plane in which side wall 324 extends. As a result, handle 316 occupies little space and does not interfere with either the viewing of indicator 342 or the flow of air through opening 334. In alternative embodiments, grasping portion 352 may extend in a plane parallel to or coextensive with the plane in which top 328 extends.

In the particular embodiment illustrated, lever arm portion 350 and grasping portion 352 of handle 316 are formed from galvanized sheet metal having a yield strength of at least 16,000 psi. In the embodiment shown, the sheet metal from which lever arm portion 350 and grasping portion 352 are formed has a thickness of approximately 1.5 millimeters. The sheet metal may be embossed or slightly deformed to a maximum thickness of about 3 millimeters for increased strength. In one embodiment, lever arm portion 350 has a maximum thickness of approximately 2.2 millimeters. As a result, lever arm portion 350 may be compactly positioned within recess 362 when handle 316 is in the retracted position. This conserves valuable space within chassis 114. At the same time, lever arm portion 350 has sufficient strength to enable module 112 to be carried by grasping portion 352 without deformation of or other damage to lever arm portion 350 under the weight of module 112.

Retainer 318 comprises a structure configured to releasably retain handle 316 in the retracted position shown in FIG. 4. As shown by FIG. 4A, retainer 318 includes a first threaded portion 370 coupled to structure 312 and a second threaded portion 372 coupled to handle 316. Threaded portion 372 threadably engages or screws to threaded portion 370 to secure handle 316 in the retracted position. In the particular embodiment illustrated, threaded portion 372 comprises a thumb screw, facilitating the connection of handle 316 to structure 312 while handle 316 is in the retracted position without additional tools. Because threaded portion 372 comprises a thumb screw, retainer 318 is also easily accessed. Threaded portions 370 and 372 securely retain handle 316 in the retracted position even under the weight of module 112 during transportation. Consequently, module 112 may be lifted and transported by means of grasping portion 352 while handle 316 is in the retraced position without the risk of retainer 318 releasing handle 316 and allowing handle 316 to pivot about axis 356. In alternative embodiments, retainer 318 may comprise other connection mechanisms configured to retain handle 316 in the retracted position. For example, in one embodiment, retainer 318 may alternatively comprise a snap latch.

Figure 6:
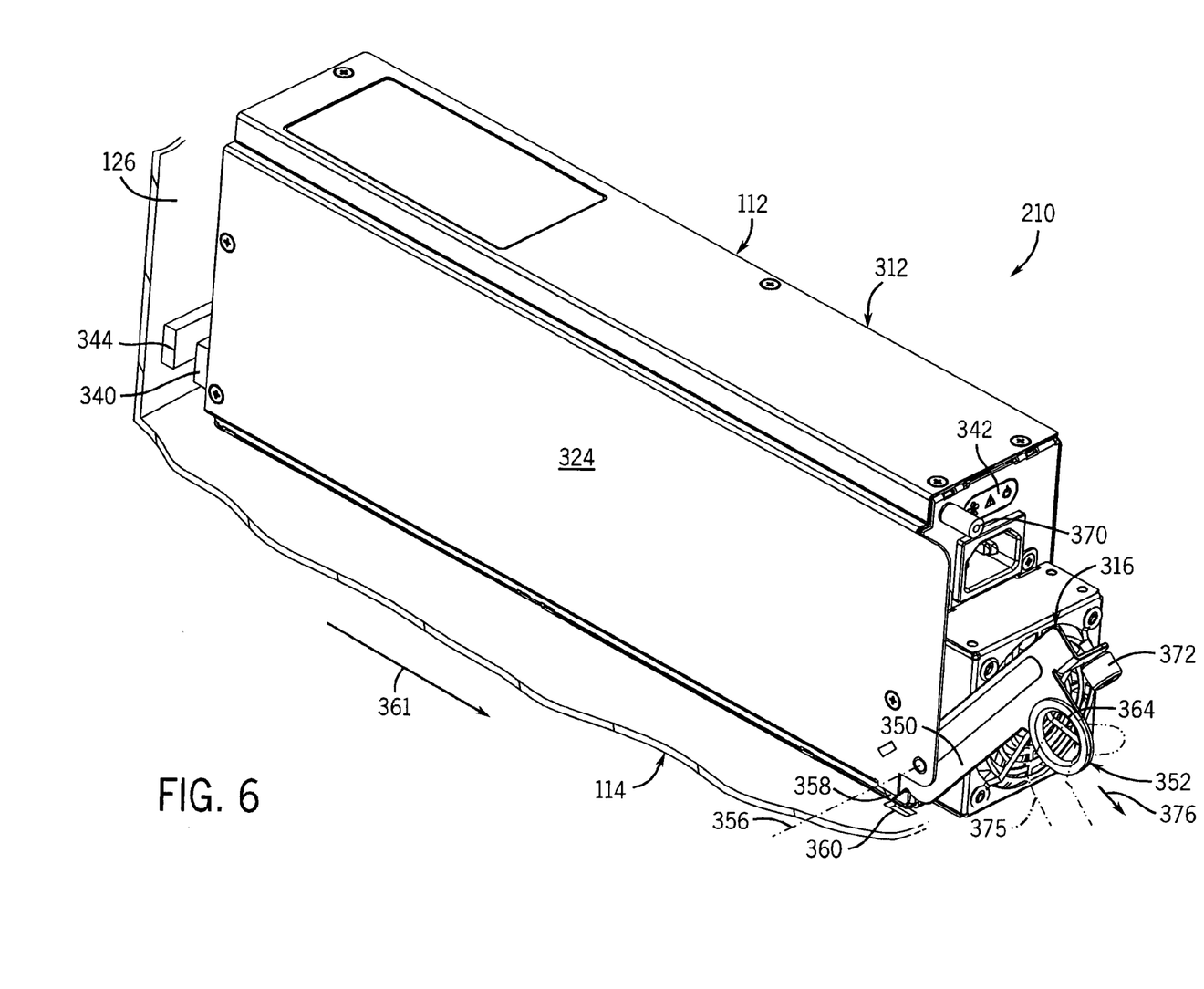
FIG. 6 illustrates the computing device and module of FIG. 4 with the handle in an extended position and with the module disconnected from the computing device.

FIG. 6 illustrates the removal of module 112 from chassis 114. As shown by FIG. 6, a person initially unscrews threaded portion 372 from threaded portion 370 to release retainer 318. Thereafter, the person inserts his or her finger 375 through opening 364 of grasping portion 352 and pulls lever arm portion 350 in the direction indicated by arrow 376 so as to pivot handle 316 about axis 356 until detent-engaging structure 358 is withdrawn from detent 360. Once detent-engaging structure 358 is at least substantially withdrawn from detent 360, handle 316 may be further pulled in the general direction indicated by arrow 361 to disconnect connectors 340 and 344 and to withdraw module 112 from bay 126 of chassis 114.

Once module 112 is removed from chassis 114, handle 316 may be pivoted about axis 356 back to the retracted position and retainer 318 may once again be connected by screwing threaded portion 372 into threaded portion 370. Module 112 may then be lifted and transported using handle 316. When retained in the retracted position, handle 316 is connected to structure 312 at two spaced distinct points, along axis 356 and at retainer 318. Consequently, handle 316 may be used to carry module 112 with reduced risk of handle 316 breaking away from structure 312.

Figure 7:
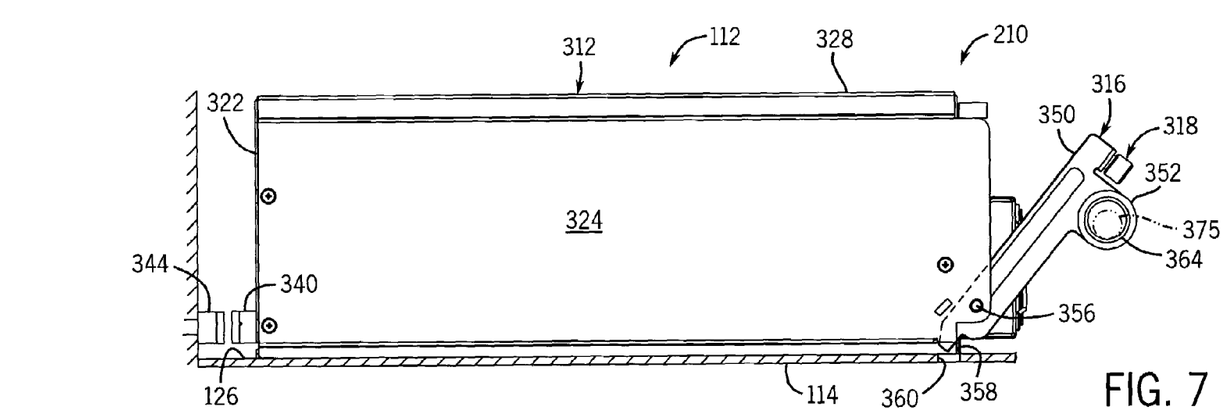
FIG. 7 is a fragmentary sectional view of the computing device and module of FIG. 4 illustrating the handle in an extended position and being inserted into a chassis of the computing device.
Figure 8:
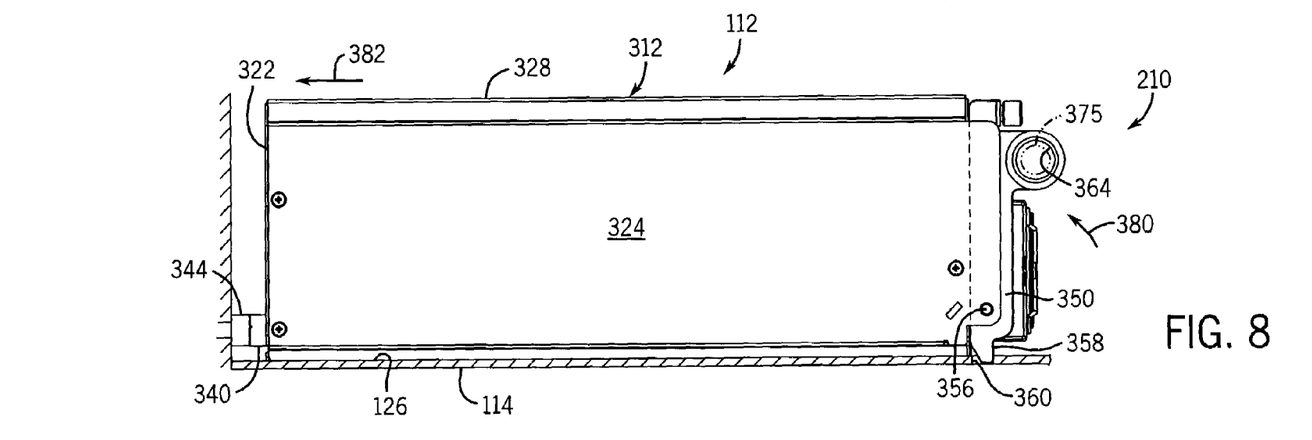
FIG. 8 illustrates a computing device and module of FIG. 7 with the handle pivoted to the retracted position and with the module connected to the computing device.

FIGS. 7 and 8 illustrate the insertion of module 112 into bay 126 of chassis 114. As shown by FIG. 7, retainer 318 is released and handle 316 is pivoted about axis 356 to the position shown. This enables module 112 to be slid or otherwise moved into bay 126 until connectors 340 and 344 are nearly in mating engagement with one another. Once at least a portion of detent-engaging structure 358 is positioned at least partially over detent 360, handle 316 is engaged by means of grasping portion 352 and lever arm portion 350 is pivoted about axis 356 in the direction indicated by arrow 380 in FIG. 8. During such pivotal movement of lever arm portion 350, detent-engaging structure 358 bears against a side surface of detent 360 to urge module 112 in the direction indicated by arrow 382. Because grasping portion 352 is spaced from pivot axis 356 by a distance larger than the distance at which detent-engaging structure 358 is spaced from pivot axis 356, handle 316 functions as a lever arm to multiply the force applied by the user to handle 316. This multiplied force enables the person to meet the connection forces required to bring connectors 340 and 344 into complete mating connection with one another. Once connectors 340 and 344 have been completely connected, retainer 318 is reconnected by screwing threaded portion 372 into threaded portion 370. As a result, handle 316 is retained in the retracted position, detent-engaging structure 358 is retained in engagement with detent 360 and module 112 is retained within bay 126 with connectors 340 and 344 fully connected to one another.

Overall, handle 316 is more intuitive to operate while improving the performance, compactness and cost of module 112 as compared to module 10. Handle 316 provides a structure that is easy and intuitive (1) to manipulate to insert module 112 within chassis 114 while achieving the necessary forces to connect module 112 to the computing device, (2) to retain module 112 within chassis 114, (3) to withdraw module 112 from chassis 114, and (4) to carry and transport module 112. Because grasping portion 352 projects away from end 320, grasping portion 352 may be easily gripped without interference from enclosure 312. Because grasping portion 352 includes an opening configured to receive a medial segment of a person's finger, handle 316 may be easily manipulated and moved between the extended position and the retracted position. In addition, handle 16 may be utilized to carry module 112 when module 112 is removed from the chassis. As compared to the conventionally known spring clip 22, retainer 318 provides a much more robust connection between handle 316 and enclosure 312. As a result, retainer 318 retains handle 316 in the retracted position under the full weight of module 112 when module 112 is being carried by handle 316. As compared to spring clip 22, the thumb screw constituting part of retainer 318 is more easily manipulated.

Handle 316 also improves the performance, compactness and cost of module 112 as compared to module 10. Because handle 316 generally extends in a plane that is parallel to or coextensive with the plane of side wall 324, handle 316 does not extend across the air flow opening of module 112 nor does it interfere with viewing of status indicator 342. Because handle 316 is formed from sheet metal, handle 316 has sufficient strength for being used to lift and move module 112 and for also serving as a lever arm to assist in the full insertion and connection of module 112 within a computing device. At the same time, handle 316 is sufficiently thin such that handle 16 may be retracted into a recess along side wall 324 while maintaining the compact nature of module 112. Moreover, because handle 316 is formed from relatively inexpensive sheet metal and because the design of handle 316 eliminates waste sheet metal, handle 316 is inexpensive to manufacture and assemble as part of module 112.

FIGS. 2-8 illustrate but one example of a computing device module of the present invention. Computing device module 112 is illustrated as including several complimentary and synergistic features utilized in conjunction with one another. In alternative embodiments, module 112 may alternatively include only some of the described features. For example, in one embodiment, grasping portion 352 may alternatively comprise an enlarged tab configured to be pinched on opposite sides by a user's thumb and finger. In other embodiments, retainer 318 may have various other connecting or releasable connection mechanisms other than a thumb screw and threaded bore. Although module 112 is illustrated for use in conjunction with internal electronic components which function as a power supply, enclosure 312, handle 316 and retainer 318 may alternatively be utilized to house other electronic components of a computing device which are modular in nature. Examples of such other electronic components may include a central processor, a removable or portable memory storage device, a permanent memory storage device or an input/output device.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A computing device module for receipt within a computing device chassis, the module comprising:
an enclosure;
a handle movably coupled to the enclosure to move between an extended position and a retracted position, wherein the handle includes at least one opening configured to permit at least one standard hand digit to extend through the at least one opening when the handle is in the retracted position, and wherein the handle extends along only a single transverse side of the enclosure when in the retracted position, wherein the chassis includes one of a detent and a detent-engaging structure and wherein the handle includes the other of the detent and the detent-engaging structure wherein the detent-engaging structure engages the detent to retain the module within the chassis when the handle is in the retracted position and wherein the detent-engaging structure is withdrawn from the detent to permit withdrawal of the module from the chassis when the handle is in the extended position, wherein the computing device includes a first connector portion and wherein the module includes a second connector portion configured to transmit signals between the module and the computing device, wherein the chassis includes one of a detent and a detent-engaging structure and wherein the handle includes the other of the detent and the detent-engaging structure, wherein the handle pivots between the extended position and the retracted position and wherein during pivoting of the handle from the extended position towards the retracted position, the detent and detent-engaging structure are in engagement so as to urge the module into the chassis and so as to urge the second connector portion into complete connection with the first connector portion.

2. The module of claim 1, wherein the at least one opening is continuously bounded.

3. The module of claim 1, wherein the at least one opening is configured to permit a standard thumb and a standard forefinger to be pinched together through the at least one opening when the handle is in the retracted position.

4. The module of claim 1, wherein the at least one opening is configured to permit a medial seg merit of at least one standard finger to extend through the at least one opening when the handle is in the retracted position.

5. The module of claim 1, wherein the at least one opening includes an arcuate surface configured to engage the at least one digit when the digit extends through the at least one opening.

6. The module of claim 5, wherein the at least one opening is circular.

7. The module of claim 1, wherein the handle pivots between the extended position and to the retracted position about an axis, and wherein the detent engaging structure is configured to extend in a direction non-parallel to the axis into the detent when the handle is in the retracted position.

8. The module of claim 7, wherein the handle pivots between the extended position and the retracted position about an axis perpendicular to the at least one opening.

9. The module of claim 8 including a retainer releasably retaining the handle in the retracted position.

10. The module of claim 9, wherein the retainer includes:
a first threaded portion coupled to the enclosure; and
a second threaded portion coupled to the handle and screwed to the first threaded portion.

11. The module of claim 10, wherein the retainer includes a thumb screw coupled to the handle and providing the second threaded portion.

12. The module of claim 1 a retainer releasably retaining the handle in the retracted position.

13. The module of claim 12, wherein the retainer includes:
a first threaded portion coupled to the enclosure; and
a second threaded portion coupled to the handle and screwed to the first threaded portion.

14. The module of claim 13, wherein the retainer includes a thumb screw coupled to the handle and providing the second threaded portion, wherein the thumb screw is configured to serve as a lifting surface for supporting a weight of the module upon removal of the module from the chassis.

15. The module of claim 1, wherein the enclosure has a side wall extending in a first plane and wherein at least a majority of the handle extends in a second plane parallel to the first plane.

16. The module of claim 1, wherein the handle has an arm portion and a grasping portion providing the at least one opening, wherein the arm portion extends from the grasping portion and is substantially received within a recess when the handle is in the retracted position such that a majority of the arm portion is concealed.

17. The module of claim 16, wherein the arm portion has a maximum thickness of about 3.0 mm.

18. The module of claim 17, wherein the arm portion has a maximum thickness of 2.2 mm.

19. The module of claim 17, wherein the arm portion is formed from sheet metal.

20. The module of claim 19, wherein the sheet metal is galvanized.

21. The module of claim 19, wherein the sheet metal has a thickness of about 1.5 mm.

22. The module of claim 1, wherein the handle is formed from a material having a yield strength of at least about 16,000 psi.

23. The module of claim 1 including at least one light-emitting display extending along a face of the module, wherein the handle has an arm portion and a grasping portion forming the opening and wherein the grasping portion extends in a plane perpendicular to the face on a transverse side of the at least on light emitting display when the handle is in the retracted position.

24. The module of claim 1, wherein the opening has at least one dimension at least 18 mm.

25. The module of claim 1, wherein the module comprises a power supply for the computing device and wherein the module includes power supply components within the enclosure.

26. The module of claim 1, wherein the enclosure includes at least one air flow opening extending along a first plane and wherein the handle extends substantially within a second plane perpendicular to the first plane on one side of the at least one air-flow opening.

27. The module of claim 1, wherein the enclosure includes at least one air flow openihg and wherein the handle extends on a single transverse side of the at least one air flow opening when in the retracted position.

28. The module of claim 27, wherein the at least one opening extends in a plane perpendicular to the axis.

29. The module of claim 27, wherein the enclosure includes a recess on a transverse side of the at least one air flow opening and wherein the recess is configured to receive a portion of the handle such that a majority of the handle is concealed within the recess when the handle is in the retracted position.

30. The module of claim 1 including at least one light emitting display extending along a face of the module, wherein the handle extends on a single transverse side of the at least one light emitting display.

31. The module of claim 1, wherein the handle is configured to permit at least one standard hand digit to extend through the at least one opening when the handle is in the extended position.

32. A computing device module for receipt within a computing device chassis, the module comprising:
an enclosure, the enclosure having a recess extending on entirely one side of the enclosure; and
a handle including:
an arm portion pivotally coupled to the enclosure so as to pivot between a retracted position in which the arm portion is received within the recess such that a majority of the arm portion is concealed and an extended position, wherein the arm portion extends in a first plane; and
a grasping portion extending from the arm portion in a second plane coextensive with or parallel to the first plane, wherein the grasping portion projects beyond the recess when the handle is in the retracted position, wherein the grasping portion extends from the recess by a distance of at least 7 mm when the handle is in the retracted position.

33. The module of claim 32, wherein the grasping portion includes at least one opening configured to permit a medial segment of at least one standard hand digit to extend through the opening when the handle is in the retracted position.

34. The module of claim 33, wherein the handle is configured to permit at least one standard hand digit to extend through the at feast one opening when the handle is in the extended position.

35. The module of claim 32, wherein the chassis includes one of a detent and a detent-engaging structure and wherein the arm portion includes the other of the detent and the detent-engaging structure and wherein the detent-engaging structure engages the detent to retain the module within the chassis when the handle is in the retracted position and wherein the detent-engaging structure is withdrawn from the detent to permit withdrawal of the module from the chassis when the handle is in the extended position, wherein the handle pivots between the extended position and the retracted position and wherein during pivoting of the handle from the extended position towards the retracted position, the detent and detent-engaging structure are in engagement so as to urge the module into the chassis.

36. The module of claim 32, wherein the recess has a maximum width of 4 mm.

37. The module of claim 32, wherein the arm portion has a maximum width of 3 mm.

38. The module of claim 32, wherein the arm portion is formed from sheet metal.

39. A method for positioning a module relative to a chassis of a computing device, the method comprising:
inserting the module into the chassis;
pivoting a handle coupled to the module from a releasing position to a retaining position in which a portion of the handle engages the chassis to urge the module into the chassis during the pivoting and retain the module within the chassis upon completing of the pivoting;
screwing the handle to an enclosure of the module to retain the handle in the retracted position; and
inserting a finger through a continuously bounded opening of the handle while the handle is in the retaining position and is screwed to the enclosure.

40. The method of claim 39, wherein the handle is screwed to at least one of the chassis and the enclosure without tools.

41. The method of claim 39 including:
removing the module from the chassis;
pivoting the handle to the retracted position;
screwing the handle to at least one of the chassis and the enclosure of the module to retain the handle in the retracted position; and
carrying the module by grasping the handle.

42. The method of claim 41, wherein the step of grasping the handle includes inserting at least one hand digit through at least one opening formed in the handle.

43. A computing device module for receipt within a computing device chassis, the module comprising:
an enclosure;
a handle movably coupled to the enclosure to move between an extended position and a retracted position, wherein the handle includes at least one opening configured to permit at least one standard hand digit to extend through the at least one opening when the handle is in the retracted position, and wherein the handle extends along only a single transverse side of the enclosure when in the retracted position, wherein the chassis includes one of a detent and a detent-engaging structure and wherein the handle includes the other of the detent and the detent-engaging structure wherein the detent-engaging structure engages the detent to retain the module within the chassis when the handle is in the retracted position and wherein the detent-engaging structure is withdrawn from the detent to permit withdrawal of the module from the chassis when the handle is in the extended position, wherein the handle pivots between the extended position and to the retracted position about an axis, and wherein the detent engaging structure is configured to extend in a direction non-parallel to the axis into the detent when the handle is in the retracted position.

44. The module of claim 43, wherein the handle pivots between the extended position and the retracted position about an axis perpendicular to the at least one opening.

45. The module of claim 44 including a retainer releasably retaining the handle in the retracted position.

46. The module of claim 45, wherein the retainer includes:
a first threaded portion coupled to the enclosure; and
a second threaded portion coupled to the handle and screwed to the first threaded portion.

47. The module of claim 46, wherein the retainer includes a thumb screw coupled to the handle and providing the second threaded portion.

48. A computing device module for receipt within a computing device chassis, the module comprising:
an enclosure, the enclosure having a recess extending on entirely one side of the enclosure; and
a handle including:
an arm portion pivotally coupled to the enclosure so as to pivot between a retracted position in which the arm portion is received within the recess such that a majority of the arm portion is concealed and an extended position, wherein the arm portion extends in a first plane; and
a grasping portion extending from the arm portion in a second plane coextensive with or parallel to the first plane, wherein the grasping portion projects beyond the recess when the handle is in the retracted position, wherein the chassis includes one of a detent and a detent-engaging structure and wherein the lever arm portion includes the other of the detent and the detent-engaging structure and wherein the detent-engaging structure engages the detent to retain the module within the chassis when the handle is in the retracted position and wherein the detent-engaging structure is withdrawn from the detent to permit withdrawal of the module from the chassis when the handle is in the extended position, wherein the handle pivots between the extended position and the retracted position and wherein during pivoting of the handle from the extended position towards the retracted position, the detent and detent-engaging structure are in engagement so as to urge the module into the chassis.

* * * * *

UNITED STATES PATENT AND TRADEMARK OFFICE
CERTIFICATE OF CORRECTION

| | | |
|---|---|---|
| PATENT NO. | : 7,379,303 B2 | Page 1 of 1 |
| APPLICATION NO. | : 10/690789 | |
| DATED | : May 27, 2008 | |
| INVENTOR(S) | : Harold Miyamura et al. | |

It is certified that error appears in the above-identified patent and that said Letters Patent is hereby corrected as shown below:

In column 9, line 44, in Claim 4, delete "seg merit" and insert -- segment --, therefor.

In column 10, line 4, in Claim 12, after "claim 1" and insert -- including --, therefor.

In column 10, line 55, in Claim 26, delete "air-flow" and insert -- air flow --, therefor.

In column 10, line 57, in Claim 27, delete "openihg" and insert -- opening --, therefor.

In column 11, line 33, in Claim 34, delete "at feast" and insert -- at least --, therefor.

Signed and Sealed this

Twenty-ninth Day of July, 2008

JON W. DUDAS
*Director of the United States Patent and Trademark Office*